June 7, 1960             A. C. KOLB             2,940,011
DEVICE FOR PRODUCING HIGH TEMPERATURES
Filed July 11, 1958             2 Sheets-Sheet 1
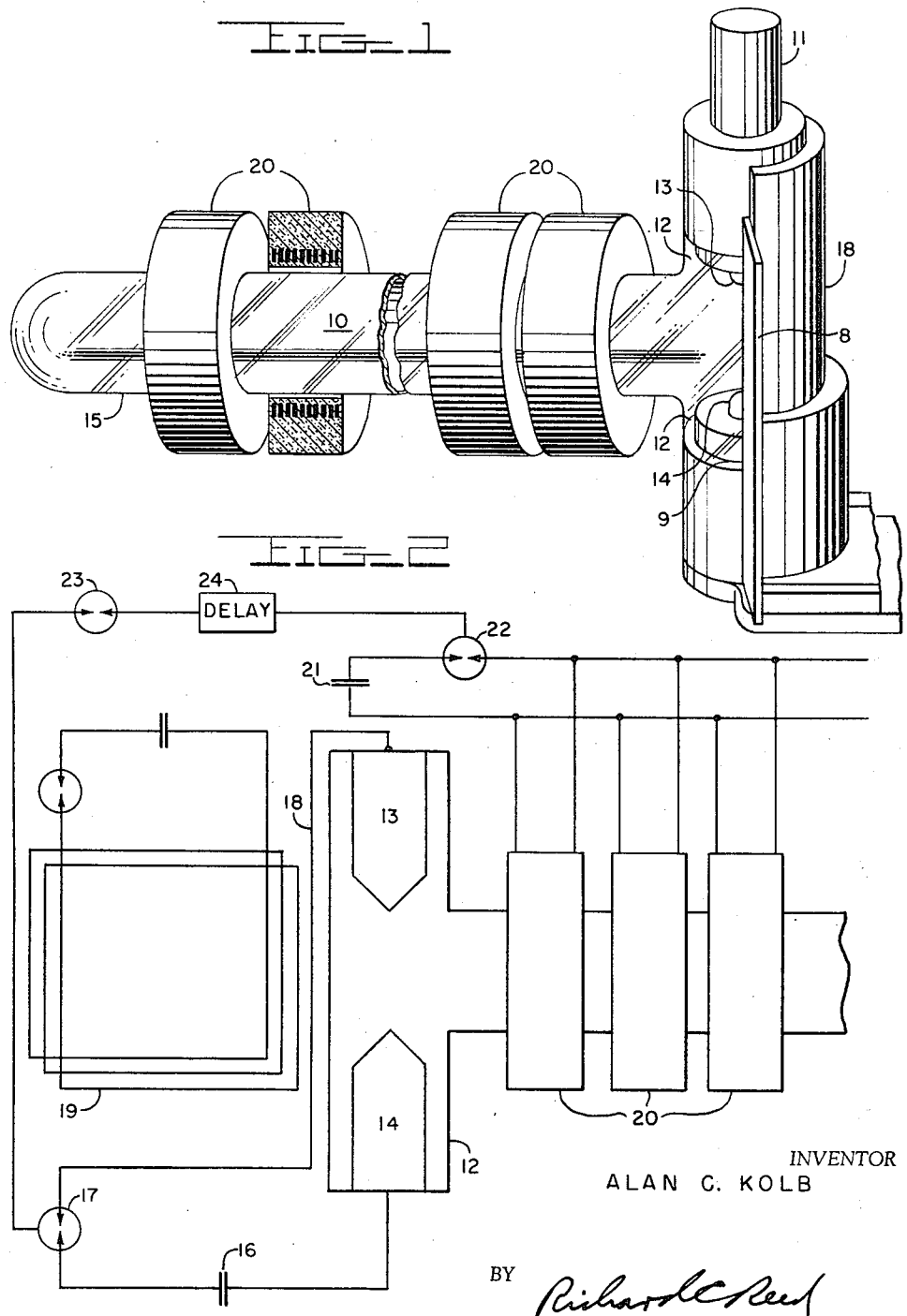
INVENTOR
ALAN C. KOLB
BY *Richard C. Reed*
ATTORNEYS June 7, 1960 A. C. KOLB 2,940,011
DEVICE FOR PRODUCING HIGH TEMPERATURES
Filed July 11, 1958 2 Sheets-Sheet 2
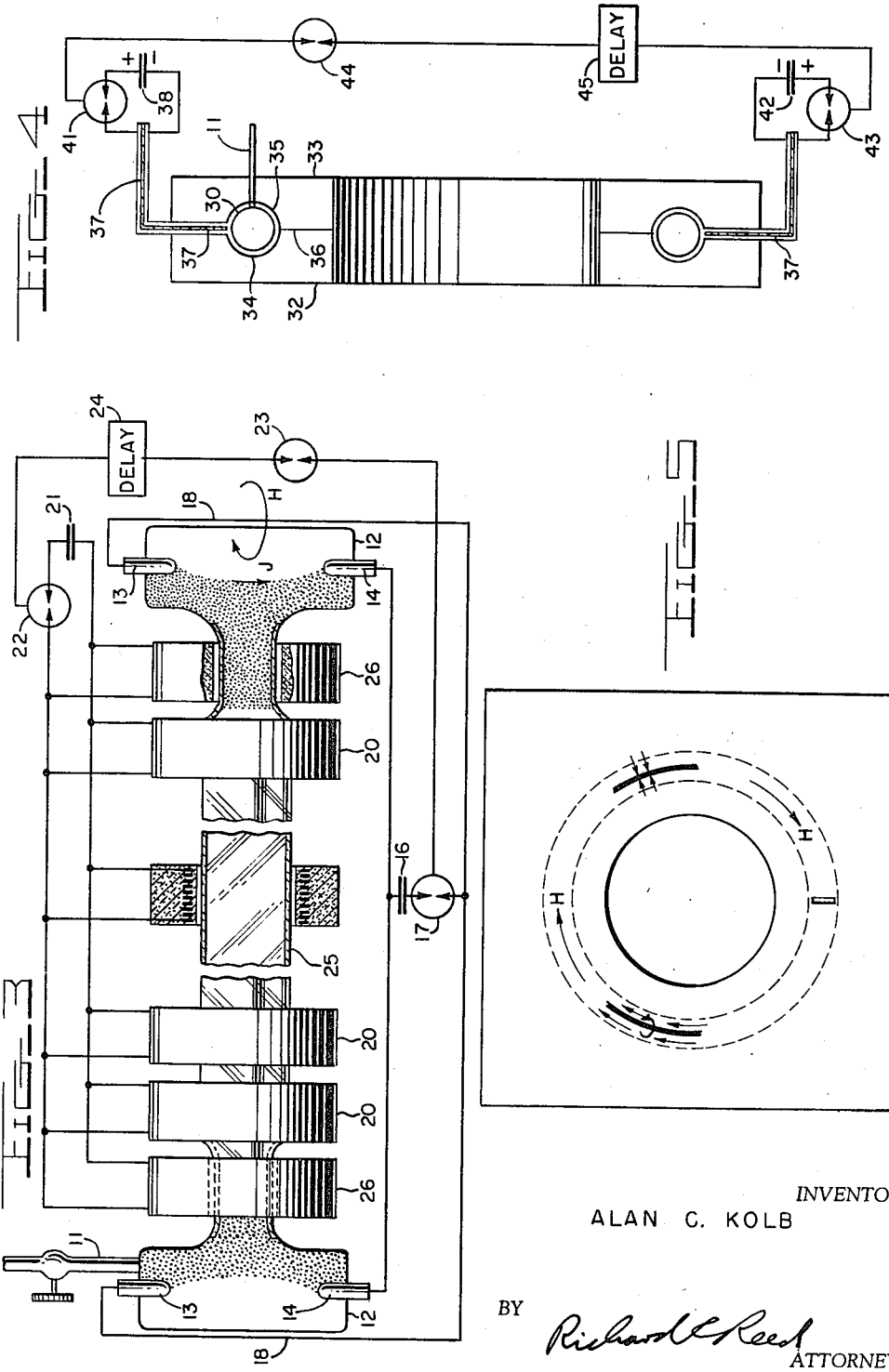
INVENTOR
ALAN C. KOLB
BY
Richard C. Reed
ATTORNEYS

United States Patent Office 2,940,011
Patented June 7, 1960

2,940,011

DEVICE FOR PRODUCING HIGH TEMPERATURES

Alan C. Kolb, 314-C Hunting Towers, Alexandria, Va.

Filed July 11, 1958, Ser. No. 748,096

20 Claims. (Cl. 315—111)

(Granted under Title 35, U.S. Code (1952), sec. 266)

The invention described herein may be manufactured and used by or for the Government of the United States of America for governmental purposes without the payment of any royalties thereon or therefor.

The present invention relates to magnetohydrodynamic devices and more particularly to a device for generating high temperatures to produce therefrom high gas velocities, and X-ray and neutron sources from a thermonuclear reaction and in the end a sustained thermonuclear reaction for energy production with a further possible use in the construction of a propulsion system with high specific energy, that is, high propulsion velocities.

Magnetohydrodynamics is defined as the study of the interaction between electromagnetic fields and electrically conducting fluids and gases. In particular electromagnetic forces can be used to control the flow of ionized electrically conducting gases and can be used to accelerate or compress and contain such a gas. Based on these principles the generation of thermonuclear energy by heating and compressing a gas comprising isotopes of hydrogen can be obtained. A controlled thermonuclear reaction can be obtained by heating a gas of deuterium or a mixture of deuterium and tritium to kinetic temperatures of about $5 \times 10^6$ degrees C. or more and controllably confining the gas at these temperatures for sufficiently long time to permit the fuel nuclei to undergo fusion with the consequent release of energy in the reaction region. At these high temperatures there will be a copious emission of neutrons and X-rays from the reacting region even though the reaction may not be self-sustaining. These neutrons and X-rays can be used in research applications. To this end a thermonuclear reaction has been obtained for short periods of time. However, at higher temperatures the reaction will be self-sustaining when the thermonuclear energy production exceeds the radiation and other energy losses. A controlled fusion reactor is known as a device within which appropriate isotopes of light elements are caused to undergo nuclear fusion, the end result being the controlled production and extraction of useful quantities of energy, in excess of that required to operate the device.

Heretofore, various types of devices have been used for producing high temperatures by gas discharges in deuterium and other gases one of which is by use of the pinch effect. In one form of the pinch effect, an ionized gas is compressed by the self-magnetic forces of a current carrying discharge. However, inherent instabilities throw the hot gases to the walls which cools the gases down. Another disadvantage of the pinch geometry is the tendency for the plasma electrons to be accelerated to very high velocities by the applied electric field resulting in "runaway" electrons that eventually escape from the system.

The present invention overcomes the shortcomings of the prior art devices by ionizing and preheating the gas in the chamber by a high velocity, magnetically accelerated shock wave and reaching a high final temperature by compressing the shock preheated plasma by a rising axial magnetic field applied parallel to the axis of the tube. The device of the present invention depends on the magnetic pressure from current carrying coils surrounding a linear or toroidal chamber so that the current encircles the plasma column and are not directed along the axis of the chamber as in the pinch effect. This geometry has the advantage that "runaway" electrons are diminished and the usual pinch instabilities are suppressed. A plasma is a completely ionized gas which is regarded as a mixture of two gases, an electron gas and a positive ion gas in equal numbers charge-wise, the latter consisting of atomic nuclei stripped of one or more of their electrons. The axial magnetic field confines the plasma to a cylindrical region (in cross-section) along the axis of the chamber and prevents cooling of the plasma by contact with the surface of the chamber.

It is therefore an object of the present invention to provide a device for producing intense high temperatures in a magnetically confined plasma.

Another object is to provide a device for accelerating gas to high velocities.

Yet another object is to provide a device for producing an X-ray and a neutron source.

Still another object is to provide a device for producing a controlled thermonuclear reaction and in the end a self-sustained thermonuclear reaction.

Other and more specific objects of this invention will become apparent upon a careful consideration of the following detailed description when taken together with the accompanying drawings, in which:

Fig. 1 illustrates a side view of a device according to the present invention;

Fig. 2 illustrates a schematic drawing of the device shown in Fig. 1 which illustrates the chamber and the related electrical circuitry;

Fig. 3 illustrates a modification of the device shown in Fig. 1;

Fig. 4 illustrates an end view of another modification; and

Fig. 5 illustrates a side view of the modification shown in Fig. 4.

A device made in accordance to the present invention comprises in general terms a chamber which is adapted to be evacuated and then filled with a supply of hydrogen isotopes. The chamber is surrounded by coils for producing a magnetic field along the axis of the chamber when a high current is passed therethrough. Means is also provided for preheating the gas by an axial shock wave or by breaking the gas down by a high voltage, high frequency field to ionize the gases so that when the magnetic field is applied the magnetic pressure generates a radially imploding shock wave which preheats the gas. The rising axial magnetic field compresses the preheated gas so as to produce high final temperatures resulting in X-ray and neutron production.

Referring now to the drawings wherein like reference characters represent like parts throughout there is shown by illustration in Figs. 1 and 2 one form of the invention. As shown, this particular device comprises a T-tube 10 which forms a chamber adapted to be evacuated and to receive a gas through a tube 11. Located at the crosshead or base 12 of the T-tube are electrodes 13 and 14 which are positioned perpendicular to the axis of the tube side arm 15 and sealed to the crosshead at 9 by any suitable means. The electrodes are connected to a suitable circuitry for producing a high current discharge between the electrodes within the tube chamber such that the current flow between the electrodes is perpendicular to the tube arm. A suitable circuit comprises any suitable current source such as a high current condenser 16 and a switch 17 for controlling the high current discharge from the condenser to the electrodes 13 and 14. The T-tube is provided with a conductor or back strap 18 behind the crosshead which carries a return current that produces a transverse magnetic field about the crosshead of the T-tube so that there is a magnetic force which drives the plasma into the sidearm of the tube. This field can be enhanced in various ways such as by other field coils 19 in an independent circuit to aid the magnetic field produced by the back strap. Such an arrangement is shown by the schematic drawing of Fig. 2. The back strap is separated from the crosshead by an insulator 8.

The side arm of the T-tube is surrounded by a number of coils 20 each connected in parallel to a large condenser bank 21 through a switch 22. The circuitry for the electrodes and the coils about the tube arm is connected to master switch 23 which controls the circuits. For the purpose of delaying the discharge of the condenser to the coils, a delay unit 24 is placed into the line. The purpose of the delay unit will be explained later in greater detail. For the purpose of charging the condensers in each circuit, any suitable power source, not shown for simplification of the drawing, is connected to the respective circuits.

In operation, the T-tube chamber is evacuated and then filled with a gas such as deuterium, or a mixture of deuterium and tritium at a suitable pressure of the order of a few tenths of a millimeter of mercury. The condensers of the various circuits are charged and the device is ready for firing. The starter button or master switch 23 is closed which permits the condenser 16 to discharge across electrodes 13 and 14. The discharge ionizes the gas in the tube to provide a plasma and the interaction of the discharge current and the transverse magnetic field produced by the back strap for the return current of the discharge accelerates the gases up the tube and a shock wave is formed which raises the plasma to a very high temperature; the higher the velocity of the shock wave the higher the temperature behind the shock front. Therefore, when the shock heated plasma enters the coils 20 positioned about the arm of the chamber, the condenser 21 is discharged through the coils by operation of the delay unit 24, the current through the coils produces a magnetic field along the axis of the chamber and about the plasma. The currents which flow in the coils induce plasma currents which exclude the magnetic field from the interior of the high conductivity plasma formed behind the shock front. In this way a boundary is established between the axial magnetic field and the plasma thereby compressing the plasma and holding it away from the walls of the chamber. This compression results in an increase in the internal energy of the plasma and maintains the high shock velocity during the transit time of the shock wave through the coils. Additional energy is deposited in the plasma by Joule heating due to the surface currents.

It has been determined that in addition to the thermal energy behind the shock wave there is roughly the same amount of energy in the kinetic energy of the motion of the plasma behind the shock wave. Thus it is desirable to convert this kinetic energy into thermal energy. A device to carry out this result is shown by a schematic illustration of Fig. 3. The device of Fig. 3 is a modification of the device of Figs. 1 and 2 wherein the chamber is formed as an H-tube rather than a T-tube. It can be said that the H-tube is formed of two T-tubes joined at their sidearms to form a cross arm between two crossheads such that shock waves can be driven toward each other. The device of Fig. 3 has electrodes 13 and 14 at each end which are connected with any suitable current discharge source such as a condenser bank 16 so that the discharge is made simultaneously at each end of the tube. By striking a discharge simultaneously at each end of the tube, shock waves are generated which travel toward each other and strike each other at the center of the compression chamber 25 between the crossheads. This collision brings the plasma to rest and transforms the energy of the ordered motion into thermal energy. As shown, the compression chamber can be made slightly smaller in diameter adjacent to the crossheads than along the rest of the chamber. This is to permit the placing of smaller diameter coils 26 at each end of the chamber to provide a magnetic mirror effect near the ends to reduce the end losses.

The operation of the device of Fig. 3 is the same as for that of the device of Fig. 1 wherein the condenser 16 is discharged simultaneously across the electrodes at the ends of the chamber and the discharge of condenser 21 is delayed until the shock waves enter the coils positioned about the chamber. Discharge of the condenser through the coils produces an axial magnetic field which compresses the gases and confines the ionized gas to a region along the axis of the chamber. In moving about the axis of the chamber in the confining volume, collisions between the positive ions and electrons of the plasma causes X-rays and at sufficiently high temperatures, collisions between ions cause fusion. Fusion of deuterium or deuterium and tritium at high temperatures provides a source of copious neutrons. These X-rays and neutrons can then be used for research purposes.

In use of the above-described devices temperatures of about $10^7$ degrees C. and shock velocities of about Mach 200 have been obtained. As an illustration, for obtaining the above values, a chamber of any suitable insulating material such as quartz having an inside diameter of about 3 cm. and a thickness of about 0.2 cm. can be used. There were 8 coils connected in parallel about the chamber which had an inside diameter of about 3.6 cm. with a width of .1 cm. and a spacing of about 1 cm. between the coils. The electrodes at the crossheads have a spacing approximately equal to the inside tube diameter and the condenser that gives rise to the electrical discharge across the electrodes to break down the gas has a rating of about 100 kv., .5 mfd., 500 kc. The current through the coils positioned about the tube is produced by a condenser bank having a rating of about 20 kv., 1430 mfd., 50 kc., which produces an axial magnetic field up to 500,000 Gauss over a volume of approximately 200 cubic centimeters.

The modification shown by illustration in Fig. 4 is in the form of a torus 30 which is formed by making a tube such as shown by Fig. 1 into a circular form without the use of the electrodes. The torus is provided with a connecting tube 11 for the purpose of evacuating the chamber and for admitting a gas into the chamber. The torus is positioned between two identical suitable metal plates or coils 32 and 33 each of which have a circular portion cut from the center and formed with a semi-circular groove 34, 35 in a side surface thereof within which the torus is positioned. The plates surround the innermost portion of the torus and make an electrical contact with each other at 36 and are separated at the outermost portion by an insulating material 37 such as Mylar which extends from the plate area to separate the electrical connections leading to the electrical discharge source. The plates 32 and 33 are connected to two different discharge circuits, a high frequency, high voltage circuit, for preionizing the cold gas in the torus chamber and a main circuit for accelerating the gas toward the axis of the tube and generating a radially imploding shock wave and for compressing the shock preheated ionized gas. The high final temperature of about $10^7$–$10^8$ degrees C. is produced by the radial compression of the preheated gas by the rising magnetic field.

For illustrative purposes, the preionizing circuit includes a 40 kv., 8 mc., 0.1 mfd., condenser 38 and a switch 41 for triggering the discharge. The circuit for compressing and accelerating the gas includes a 20 kv., 285,000 Joule, 1430 mfd., condenser 42, and a switch 43. The system is provided with a delay circuit from a main switch 44 to the discharge circuits in order to delay the discharge of the condenser 42 until after the gas has been ionized by the discharge of the condenser 38.

In operation, the condensers are charged, the torus chamber is evacuated and a gas such as deuterium or a deuterium-tritium mixture is admitted into the chamber at about .01–.3 mm. of pressure. The master switch 44 is closed which causes the ionizing condenser 38 to discharge and the high frequency current from the condenser passes through the coils 32 and 33 to set-up high voltages about the torus chamber, which ionizes the gas within the tube. After ionizing the gas, the main condenser bank 42 is discharged through operation of the delay switch 43 to produce a rapidly rising axial magnetic field.

The rapidly rising axial magnetic field cause currents to flow in the plasma so that magnetic pressure drives the preionized gas radially inward and a shock wave is formed. In this way the plasma can be highly ionized and the temperature raised to about $10^6$ degrees C. As before, the high final temperature is reached by compressing the shock preheated plasma further by the continually rising axial field. The ionization, radial acceleration, and compression of the gases produces a high temperature, high density plasma in the tube. It is to be noted that plasma drift will occur in the chamber away from the center of the tube due to the curvature and field gradient thereof; however, at high magnetic field strengths of about $5 \times 10^5$ Gauss the drift is slow and does not effect operation of the tube during the time of interest.

High magnetic fields with long containment periods used with the above devices can be used to produce temperatures in the thermonuclear range, and it may be possible through use of these devices to produce a sustained thermonuclear reaction. As an illustration, with the torus, acceleration and compression of the ionized gas produces a circular current about the plasma column in the center of the chamber. At sufficiently high temperatures, the thermonuclear energy produced will exceed the energy losses, and as a result, the energy of the plasma will increase and the plasma column will expand against the magnetic field. This expansion will result in induced voltages in the external circuit and electrical energy can be extracted thereby. Cyclic operation of the device with a bias magnetic field could be used to keep the plasma away from the walls such that a sustained reaction can be maintained.

Obviously many modifications and variations of the present invention are possible in the light of the above teachings. It is therefore to be understood that within the scope of the appended claims the invention may be practiced otherwise than as specifically described.

What is claimed is:

1. A device for producing high temperatures which comprises a chamber, means adapted for evacuating and then admitting a gas into said chamber, means for producing high velocity shock waves for preheating said gas, means for producing a magnetic field along the axis of said chamber, said magnetic field compressing said preheated gas thereby raising the temperature thereof to produce high gas volocities, X-rays and neutrons.

2. A device for producing high temperatures which comprises a chamber, means adapted for evacuating and then admitting a gas into said chamber, means adapted for generating high velocity shock waves along the axis of said chamber to preheat and ionize said gas, an electrical discharge means adapted to produce an axial magnetic field about said chamber, said magnetic field adapted to compress said preheated and ionized gas thereby raising the temperature thereof to produce high gas velocities, X-rays and neutrons.

3. A device for producing high temperatures which comprises a chamber, means adapted for evacuating and then admitting a gas into said chamber, coil means positioned about said chamber, means adapted for generating high velocity shock waves along the axis of said chamber to heat and ionize said gas, electrical discharge means adapted to be connected with said coil means for producing an axial magnetic field about said chamber, said magnetic field adapted to compress said preheated and ionized gas thereby raising the temperature thereof to produce high gas velocities, X-rays and neutrons.

4. A device for producing high temperatures as claimed in claim 3 wherein said chamber is elongated.

5. A device for producing high temperatures as claimed in claim 3 wherein said chamber is in the form of a torus.

6. A device for producing high temperatures which comprises an elongated chamber, means adapted for evacuating and admitting a gas into said chamber, coil means positioned about said chamber, at least one pair of electrodes positioned at an end of said chamber, a high voltage, low inductance electrical discharge means connected to said electrodes and adapted to ionize the gas by means of a magnetically accelerated shock wave in said chamber, and an electrical discharge means adapted to be connected with said coil means for producing an axial magnetic field about said chamber, said magnetic field adapted to compress said ionized gas to prevent the gas from contacting the chamber surface thereby producing a high temperature, high gas velocities, X-rays and neutrons.

7. A device for producing high temperatures and high gas velocities which comprises an elongated T-tube, means adapted for evacuating and admitting a gas into said T-tube, coil means positioned about said tube, a pair of electrodes positioned at one end of said elongated tube, means positioned adjacent to said electrodes and adapted to produce a magnetic field transverse to said electrodes, a high voltage, low inductance electrical discharge means adapted to be connected to said electrodes to ionize the gas in said tube when discharged, said transverse magnetic field adapted to force said ionized gas through the length of said tube by means of a magnetically accelerated shock wave, an electrical discharge means adapted to be connected to said coil means to produce a rising axial magnetic field about said tube when discharged, the last mentioned magnetic field compresses said ionized gas thereby producing high temperatures and high gas velocities, X-rays and neutrons.

8. A device for producing high temperatures and high gas velocities which comprises an elongated T-tube, means adapted for evacuating and admitting a gas into said T-tube, coil means positioned about said tube, a pair of electrodes positioned at one end of said elongated tube and perpendicular to the longitudinal axis of said tube, means positioned adjacent to said electrodes and adapted to produce a magnetic field transverse to said electrodes, a high voltage, low inductance electrical discharge means adapted to be connected to said electrodes to ionize the gas in said tube when discharged, said transverse magnetic field adapted to force said ionized gas through the length of said tube by means of a magnetically accelerated shock wave, an electrical discharge means adapted to be connected to said coil means to produce a rising axial magnetic field about said tube when discharged, the last mentioned magnetic field compresses said ionized gas thereby producing high temperatures, high gas velocities, X-rays and neutrons.

9. A device for producing a high temperature and high gas velocities, which comprises a T-tube, means adapted for evacuating and admitting a gas into said tube, a pair of electrodes positioned at one end of said tube perpendicular to the longitudinal axis thereof, a back strap positioned along an end of said tube parallel with said electrodes and adapted to produce a magnetic field transverse to said electrodes, a high voltage, low inductance electrical discharge means adapted to be connected to said electrodes to ionize the gas in said tube when discharged, said back strap being connected in the discharge circuit to produce said transverse magnetic field, coil means positioned about said tube adapted to produce an axial magnetic field about said tube, an electrical discharge means adapted to be connected to said coil means whereby discharge of the last mentioned discharge means through said coil means produces a rising axial magnetic field about said tube, said slow rising magnetic field compresses said ionized gas to confine the gas to the center of said tube thereby producing a high gas temperature, high gas velocities, X-rays and a neutron source.

10. A device for producing a high temperature and high gas velocities, which comprises a T-tube, means adapted for evacuating and admitting a gas into said tube, a pair of electrodes positioned at one end of said tube perpendicular to the longitudinal axis thereof, a back strap positioned along an end of said tube parallel with said electrodes and adapted to produce a magnetic field transverse to said electrodes, a high voltage, low inductance electrical discharge means adapted to be connected to said electrodes to ionize the gas in said tube when discharged, said back strap being connected in the discharge circuit to produce said transverse magnetic field, at least one coil positioned about said tube adapted to produce an axial magnetic field about said tube, an electrical discharge means adapted to be connected to said coil means whereby discharge of the last mentioned discharge means through said coil produces a rising axial magnetic field about said tube, said rising magnetic field compresses said ionized gas to confine the gas to the center of said tube thereby producing a high gas temperature, high gas velocity, X-rays and a neutron source.

11. A device for producing a high temperature and high gas velocity, which comprises a T-tube, means adapted for evacuating and admitting a gas into said tube, a pair of electrodes positioned at one end of said tube perpendicular to the longitudinal axis thereof, a back strap positioned along an end of said tube parallel with said electrodes and adapted to produce a magnetic field transverse to said electrodes, a high voltage, low inductance electrical discharge means adapted to be connected to said electrodes to ionize the gas in said tube when discharged, said back strap being connected in the discharge circuit to produce said transverse magnetic field, more than one coil positioned about said tube adapted to produce an axial magnetic field about said tube, an electrical discharge means adapted to be connected to said coils whereby discharge of the last mentioned discharge means through said coils produces a rising axial magnetic field about said tube, said rising magnetic field compresses said ionized gas to confine the gas to the center of said tube thereby producing a high gas temperature, high gas velocity, X-rays and a neutron source.

12. A device for producing a high temperature and high gas velocity, which comprises a T-tube, means adapted for evacuating and admitting a gas into said tube, a pair of electrodes positioned at one end of said tube perpendicular to the longitudinal axis thereof, a back strap positioned along an end of said tube parallel with said electrodes and adapted to produce a magnetic field transverse to said electrodes, a high voltage, low inductance electrical discharge means adapted to be connected to said electrodes to ionize the gas in said tube when discharged, said back strap being connected in the discharge circuit to produce said transverse magnetic field, more than one coil positioned about said tube and connected in parallel to each other and adapted to produce an axial magnetic field about said tube, an electrical discharge means adapted to be connected to said coils whereby discharge of the last mentioned discharge means through said coils produces a rising axial magnetic field about said tube, said rising magnetic field compresses said ionized gas to confine the gas to the center of said tube thereby producing a high gas temperature, high gas velocity, X-rays and a neutron source.

13. A device for producing high temperatures and high velocity gas which comprises an H-tube having a base at each end separated by a cross-arm, means adapted for evacuating and admitting a gas into said H-tube, coil means positioned about said cross arm, a pair of electrodes positioned at each end of said tube at the base thereof, means positioned adjacent to said electrodes at each end of said tube and adapted to produce a magnetic field transverse to each pair of electrodes, a high voltage, low inductance electrical discharge means adapted to be connected across said electrodes to ionize the gas in said tube when discharged, said transverse magnetic field adapted to force said ionized gas along the length of said cross arm by means of a magnetically accelerated shock wave, and electrical discharge means adapted to be connected to said coil means to produce a rising axial magnetic field about said tube when discharged, the last mentioned magnetic field compresses said ionized gas thereby producing high temperatures, high gas velocities, X-rays and a neutron source.

14. A device for producing high temperatures and high velocity gas which comprises an H-tube having a base at each end separated by a cross arm, means adapted for evacuating and admitting a gas into said H-tube, coil means positioned about said cross arm, a pair of electrodes positioned at each end of said tube at the bases thereof perpendicular to the longitudinal axis of said cross arm, means positioned adjacent to said electrodes at each end of said tube and adapted to produce a magnetic field transverse to each pair of electrodes, a high voltage, low inductance electrical discharge means adapted to be connected across said electrodes to ionize the gas in said tube when discharged, said transverse magnetic field adapted to force said ionized gas along the length of said cross arm by means of a magnetically accelerated shock wave, and electrical discharge means adapted to be connected to said coil means to produce a rising axial magnetic field about said tube when discharged, the last mentioned magnetic field compresses said ionized gas thereby producing high temperatures, high gas velocities, X-rays and a neutron source.

15. A device for producing high temperatures and high gas velocity which comprises an H-tube having a base at each end separated by a cross arm, means adapted for evacuating and admitting a gas into said chamber, at least one coil positioned about said cross arm, a pair of electrodes positioned at each end of said tube at the bases thereof, means positioned adjacent to said electrodes at each end of said tube and adapted to produce a magnetic field transverse to each pair of electrodes, a high voltage, low inductance electrical discharge means adapted to be connected across said electrodes to ionize the gas in said tube when discharged, said transverse magnetic field adapted to force said ionized gas along the length of said cross arm by means of a magnetically accelerated shock wave, and electrical discharge means adapted to be connected to said coil to produce a rising axial magnetic field about said tube when discharged, the last mentioned magnetic field compresses said ionized gas thereby producing high temperatures, high gas velocities, X-rays and a neutron source.

16. A device for producing high temperatures and high velocity gas which comprises an H-tube having a base at each end separated by a cross arm, means adapted for evacuating and admitting a gas into said chamber, more than one coil positioned about said cross arm, a pair of electrodes positioned at each end of said tube at the bases thereof, means positioned adjacent to said electrodes at each end of said tube and adapted to produce a magnetic field transverse to each pair of electrodes, a high voltage, low inductance electrical discharge means adapted to be connected across said electrodes to ionize the gas in said tube when discharged, said transverse magnetic field adapted to force said ionized gas along the length of said cross arm by means of a magnetically accelerated shock wave, and electrical discharge means adapted to be connected to more than one coil to produce a rising axial magnetic field about said tube when discharged, the last mentioned magnetic field compresses said ionized gas thereby producing high temperatures and high velocities.

17. A device as claimed in claim 16 wherein said spaced coils are connected in parallel to each other.

18. A device for producing high temperatures and high gas velocities which comprises an H-tube having a base at each end separated by a cross arm, means adapted for evacuating and admitting a gas into said chamber, spaced coils positioned about said cross arm, a pair of electrodes positioned at each end of said tube at the bases thereof perpendicular to the longitudinal axis of said cross arm, a back strap positioned along each of said bases parallel with said electrodes and adapted to produce a magnetic field transverse to said electrodes, a high voltage, low inductance electrical discharge means adapted to be connected across said electrodes to ionize the gas in said tube when discharged, said back strap being connected in the discharge circuit to produce said transverse magnetic field, spaced coils positioned about said tube and connected in parallel to each other adapted to produce an axial magnetic field about said tube, an electrical discharge means adapted to be connected to said coils whereby discharge of the last mentioned discharge means produces a rising axial magnetic field about said tube, said rising magnetic field compresses said ionized gas to confine the gas along the center of said tube thereby producing a high gas temperature, high gas velocity, X-rays and a neutron source.

19. A device for producing high temperatures which comprises a discharge chamber in the form of a torus, means adapted for evacuating and then admitting gas into said chamber, coils positioned relative to said discharge chamber adapted to produce an axial magnetic field through said chamber, high voltage, high frequency electrical discharge means adapted to be connected across said chamber for ionizing a gas therein, electrical discharge means adapted to be connected with said coils for radially accelerating said ionized gas toward the axis of the torus and compressing the ionized gas thereby raising the gas to high temperatures.

20. A device for producing high temperatures which comprises a discharge chamber in the form of a torus, means adapted for evacuating and then admitting a gas into said chamber, coils positioned about said chamber, a high voltage, high frequency electrical discharge means adapted to be connected to said coils to ionize the gas in said chamber when said discharge means is discharged, electrical discharge means adapted to be connected to said coils whereby discharge of the last mentioned discharge means through said coils produces a rising axial magnetic field in said tube, said rising magnetic field compresses said ionized gas to confine the gas to the center of said tube thereby producing a high gas temperature in said tube.

References Cited in the file of this patent
UNITED STATES PATENTS

| | | |
|---|---|---|
| 2,728,877 | Fischer | Dec. 27, 1955 |
| 2,787,730 | Berghaus et al. | Apr. 2, 1957 |
| 2,796,545 | Brasch et al. | June 18, 1957 |